UNITED STATES PATENT OFFICE.

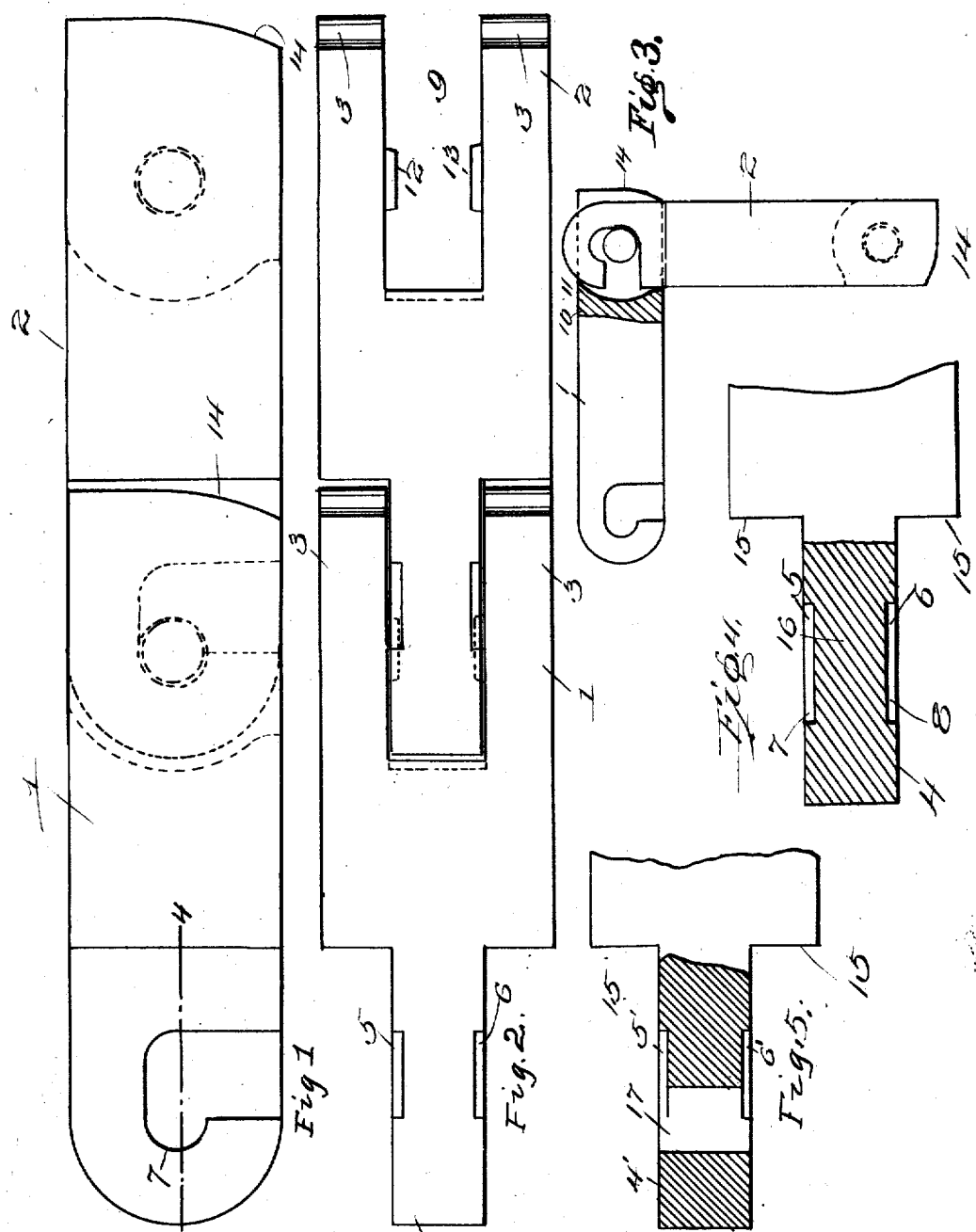

WALTER G. WITHERS, OF ATLANTA, GEORGIA.

SASH-WEIGHT.

No. 901,053.　　　Specification of Letters Patent.　　　Patented Oct. 13, 1908.

Application filed May 19, 1908. Serial No. 433,753.

*To all whom it may concern:*

Be it known that I, WALTER G. WITHERS, a citizen of the United States, residing at Atlanta, in the county of Fulton and State of Georgia, have invented certain new and useful Improvements in Sash-Weights; and I do hereby declare the following to be a full, clear, and exact description of the invention, such as will enable others skilled in the art to which it appertains to make and use the same.

This invention relates to improved sash weights, and has for an object the provision of a jointed sash weight that is so mounted as to not become unjointed during use.

Another object in view is the provision of a sash weight arranged with a plurality of links formed with engaging means that will prevent the disengaging of any of the links until the links are brought to a predetermined position.

A still further object of the invention is the provision of sash weights formed of links arranged with a bifurcated end having projections extending therefrom and an end formed with a tongue having ways positioned therein, the bifurcated end of one link being adapted to have the tongue of the adjoining link positioned therebetween, and the projection from the bifurcated end positioned in the ways in the tongue.

With these and other objects in view, the invention comprises certain novel constructions, combinations and arrangements of parts that will be hereinafter fully described and claimed.

In the accompanying drawing:—Figure 1 is a side elevation of two links joined together for forming a sash weight. Fig. 2 is a top plan view of the weight shown in Fig. 1. Fig. 3 is a side elevation of two links on a reduced scale, the same being shown in a position ready for securing together or a removal. Fig. 4 is a fragmentary sectional view of one end of Fig. 1 approximately on line 4—4. Fig. 5 is a view similar to Fig. 4 disclosing a slight modified construction.

In the construction of sash weights, particularly flexible sash weights made from a plurality of pieces joined together, it has been found very desirable to make the same so as to be easily joined and disjoined, and when joined to be locked in a certain sense.

Referring more particularly to the drawing, 1 and 2 indicate links which have bifurcated extensions 3—3 on one end and on the opposite end a tongue 4 formed with ways 5 and 6 and journal portions 7 and 8.

The opening 9 between projections 3—3 is formed rounded at 10, as clearly seen in Figs. 1 and 3, so that when any slack is brought upon the weight the upper links cannot be deranged or moved out of place, as the tongue 4 of each of the upper links comes in contact with the upper edge 11 of the respective links or against the sides of the bearings of journal portions 7 and 8.

The bearings or journal portions 7 and 8 are adapted to extend only partially through the tongue 4, as clearly seen in Fig. 4 and are adapted to receive journal members 12 and 13 projecting from the inner faces of the extension 3—3. The projections 12 and 13 may be cylindrical or beveled, as may be desired.

When it is desired to use several of the links for forming a complete weight of any desired size a link as 2 is placed in position, as shown in Fig. 3, over link 1 and the lugs or projections 12 and 13 are permitted to pass through ways 5 and 6 until they reach the bearings 7 and 8, then the link 2 is moved pivotally upon members 12 and 13 until the same is in position as shown in Fig. 1. When in this position link 2 cannot be removed, and in order to be removed must be turned substantially to the position shown in Fig. 3.

By this construction and arrangement it will be observed that none of the links can become unfastened or detached while in operation. Each of the extensions 3—3 are rounded at 14 in order to permit proper pivotal movement of the respective links. The upper ends of extensions 3—3 are also spaced away from the shoulder portion 15 of the link when the respective links are in their correct position for operation. This permits a slight up and down movement of the respective links, which acting together with the pivotal movement of the respective links permit free action of the respective parts of the entire weight, but by the particular construction and arrangement of the curved seat or bottom 10 of the hollowed out portion 9 the respective links cannot come unfastened without being moved to a position substantially as shown in Fig. 3. In constructing the journal members 12 and 13 in the ways 5 and 6 together with the journal bearings 7 and 8 it is to be noted that the tongue 4 is not weakened by an aperture passing therethrough, nor a slot passing from the edge of the weight to the aperture, but simply depressed portions are provided for the journal bearings and depressed ways are provided for permitting the members 12 and 13 to enter into the journal bearings. A web 16 is thus retained in tongue 4 that thoroughly braces and sustains the tongue portion.

In Fig. 5 will be seen a slight modification in which a tongue 4' is presented, having ways 5' and 6'. The ways 5' and 6' merge into an aperture 17 that passes entirely through the tongue 4'. This aperture 17 is adapted to take the place of the bearings 7 and 8.

The ways 5 and 6 and also ways 5' and 6', together with the bearings 7 and 8, and also 17, form an L-shaped way for receiving and accommodating the journals 12 and 13.

In arranging a weight formed according to the present invention it will be observed that the same forms a flexible weight and yet one having substantially the weight of a straight bar or rod by reason of the compactness of the construction, only sufficient space being left between the various parts to permit proper movement. It will be noted in this connection that where one link or unit is cut out or cut away the adjoining link or unit is formed with members for filling in the cut out or cut away portions just mentioned so as to fill substantially all the space occupied by the weight.

What I claim is:—

1. In a sash weight, a weight formed of a plurality of units, each unit being provided with a tongue at one end said tongue having its end semi-circular, and a bifurcated portion at the opposite end, a hollowed out portion between the arms of the bifurcation formed upon the arc of a circle, said tongue being formed with journal bearings and ways for permitting the bearing members to be inserted in said journal bearings, and said bifurcated portion being formed with journals extending therefrom and adapted to enter the bearings of the tongue of an adjoining link, the tongue of the adjoining link when inserted into said bifurcation being prevented from accidental removal by the curved bottom of the opening between the arms of the bifurcation.

2. In a sash weight, a weight formed of a plurality of units pivotally secured together, each link being formed of a bifurcated end and a tongue, the tongue of one link being adapted to fit between the furcations of the adjoining link, the hollowed out portion between the respective bifurcated ends, having its bottom formed arc-shaped and the ends of the respective tongues being formed arc-shaped, the arc-shaped construction of the bottom of the opening of the bifurcations preventing the tongue from becoming displaced accidentally.

In testimony whereof I have affixed my signature in presence of two witnesses.

WALTER G. WITHERS.

Witnesses:
R. A. THOMPSON,
B. E. WILLIAMS.